Nov. 3, 1959 B. R. GREENHEAD 2,911,466

METHOD OF AND APPARATUS FOR THE CONTROL OF TELEVISION PICTURE SIGNALS

Filed Jan. 24, 1955 5 Sheets-Sheet 1

Inventor

BERNARD R GREENHEAD

By Holcombe, Wetherill & Brisebois

Attorneys

Inventor
BERNARD R. GREENHEAD
By Holcombe, Wetherill & Brisebois
Attorneys

Nov. 3, 1959 B. R. GREENHEAD 2,911,466

METHOD OF AND APPARATUS FOR THE CONTROL OF TELEVISION PICTURE SIGNALS

Filed Jan. 24, 1955 5 Sheets-Sheet 3

Inventor
BERNARD E GREENHEAD
By Holcombe, Wetherill & Brisebois
Attorneys

Nov. 3, 1959

B. R. GREENHEAD

METHOD OF AND APPARATUS FOR THE CONTROL OF TELEVISION PICTURE SIGNALS 2,911,466

Filed Jan. 24, 1955

5 Sheets-Sheet 4

Inventor

BERNARD R. GREENHEAD

By Holcombe, Wetherill, & Brisebois

Attorneys

Inventor
BERNARD R GREENHEAD
By Holcombe Wetherill & Brisebois
Attorneys

United States Patent Office 2,911,466

Patented Nov. 3, 1959

2,911,466

METHOD OF AND APPARATUS FOR THE CONTROL OF TELEVISION PICTURE SIGNALS

Bernard Randolph Greenhead, London, England, assignor to H.D.F. Limited, London, England, a British company Application January 24, 1955, Serial No. 483,587

Claims priority, application Great Britain July 28, 1952

6 Claims. (Cl. 178—6.8)

Figure 1:
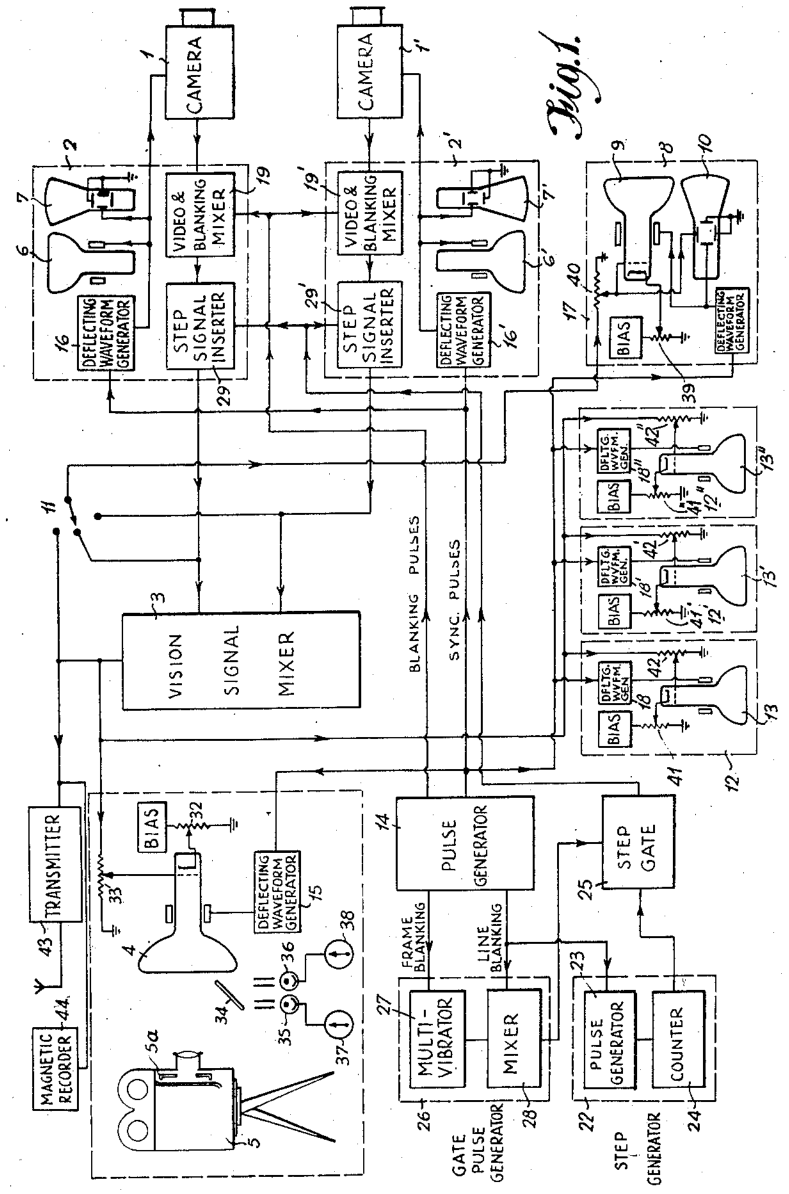

The present invention relates to a method of and apparatus for the control of television picture signals in television transmission equipment whereby the lift (black level settings) and amplitude of the picture signals can be accurately controlled or adjusted to a desired value, and the output from the different cameras or other picture generating devices may be accurately matched. The invention is particularly applicable to the control of picture signals in apparatus for producing motion picture films by the use of television transmission equipment, that is in apparatus in which the pictures to be recorded on the film are converted by a television camera to television picture signals which, in turn, are reconstituted in a cathode ray tube or other picture reconstituting device to form images which are recorded on the cinematograph film.

This application is a continuation-in-part of my copending application Serial No. 370,520 filed 27th July 1953, now abandoned.

One of the problems encountered in current television studio practice is to be able to adjust the black level and amplitude of the picture signals to predetermined values. When recording television picture signals on cinematograph films, precise control of the black level and amplitude of the picture signals is essential if good results are to be obtained. This precise control is necessary due to the limited range of the photographic recording process. The present invention has for its object to provide a method and apparatus by means of which the black level and amplitude of television picture signals may be accurately adjusted, and which also enables the signal outputs from different cameras to be accurately matched.

To this end, the invention consists in producing a control signal independently of the picture signals and comparing the picture signals, during the operation of the transmission equipment, with the control signal by reproducing the control signal and picture signals simultaneously on a cathode ray tube, the control signal serving as a reference standard by means of which the black level and gain controls for the picture signals may be accurately set for optimum results. In installations having several cameras, the picture signal outputs from the various camera chains may be compared with the same control signal and thereby matched between themselves. Preferably, the control signal is mixed into the picture signal waveform or waveforms so that it appears on the screen of a reproducing cathode ray tube simultaneously with the pictures. The control signal, adjusted to a predetermined value or range of values and serving as a reference standard, enables the brightness and contrast controls of the cathode ray tube to be accurately set to predetermined values, and if the system incorporates a number of cathode ray tubes, for example for monitoring purposes, the brightness and contrast controls of all the tubes may be accurately matched. In the case of recording television pictures on cinematograph film, the control signal enables the bias of the recording cathode ray tube and the amplitude of the video signals applied thereto to be set precisely, whereby the recording can be carried out under such controlled conditions that good recordings can be consistently obtained.

In the preferred form of the invention, the control signal comprises a step waveform consisting of a plurality of steps of increasing amplitude according to a linear, logarithmic or other desired scale. This step waveform when reproduced on the picture reproducing cathode ray tube or tubes, simultaneously with the pictures, appears as a strip having areas of different steps of brightness. The step waveform may be inserted into the video waveform during the line or frame blanking intervals so that the strip appears on the cathode ray tube either at one side or the other, or at the top or bottom, of the picture thereby enabling comparison of the picture with the brightness steps of the control signals to be easily and accurately effected. The step waveform may also be reproduced simultaneously with the video waveform on a waveform monitor tube, whereby the black level and amplitude of the video waveform may be directly compared with the reference steps of the step waveform and be precisely adjusted.

The number of steps in the control waveform may be selected as desired, and whilst a waveform having only two steps, corresponding respectively to the required black level and peak white, is sufficient, it is preferred to employ a control waveform containing more than two steps in order that reference values intermediate black and peak white will be available with which various parts of the picture may be compared. In practice a control waveform having ten steps has proved adequate and convenient, the first and last steps being adjusted to correspond with the required values for black level and peak white and the remaining steps representing intermediate light intensities between these lower and upper levels. In film recording the lower and upper levels are so adjusted on the recording cathode ray tube, that upon development to the correct gamma value of the negative image on the film being used they will respectively produce minimum density and maximum density areas on the developed film. Having co-related the lower and upper levels of the control signal with the film characteristics, the picture signals can be adjusted precisely in relation to the control signal to ensure the desired quality of recording. Having once determined the lower and upper levels of the control signal for satisfactory recording on a particular grade of film, these levels can readily be set up or maintained by means of a light meter, for example by means of one or more photo-cells which are arranged to respond to the requisite parts of the step control signal reproduced on the recording cathode ray tube.

If desired the control signal reproduced on the screen of the recording cathode ray tube may be recorded on the film simultaneously with the pictures and be used as a check on the film developing process.

In order that the invention may be more clearly understood, reference will now be made to the accompanying drawings, in which:

Figure 1 is a block circuit diagram of apparatus according to this invention for the production of motion picture films, by the use of television transmission equipment.

Figures 2, 5, 6, 7:
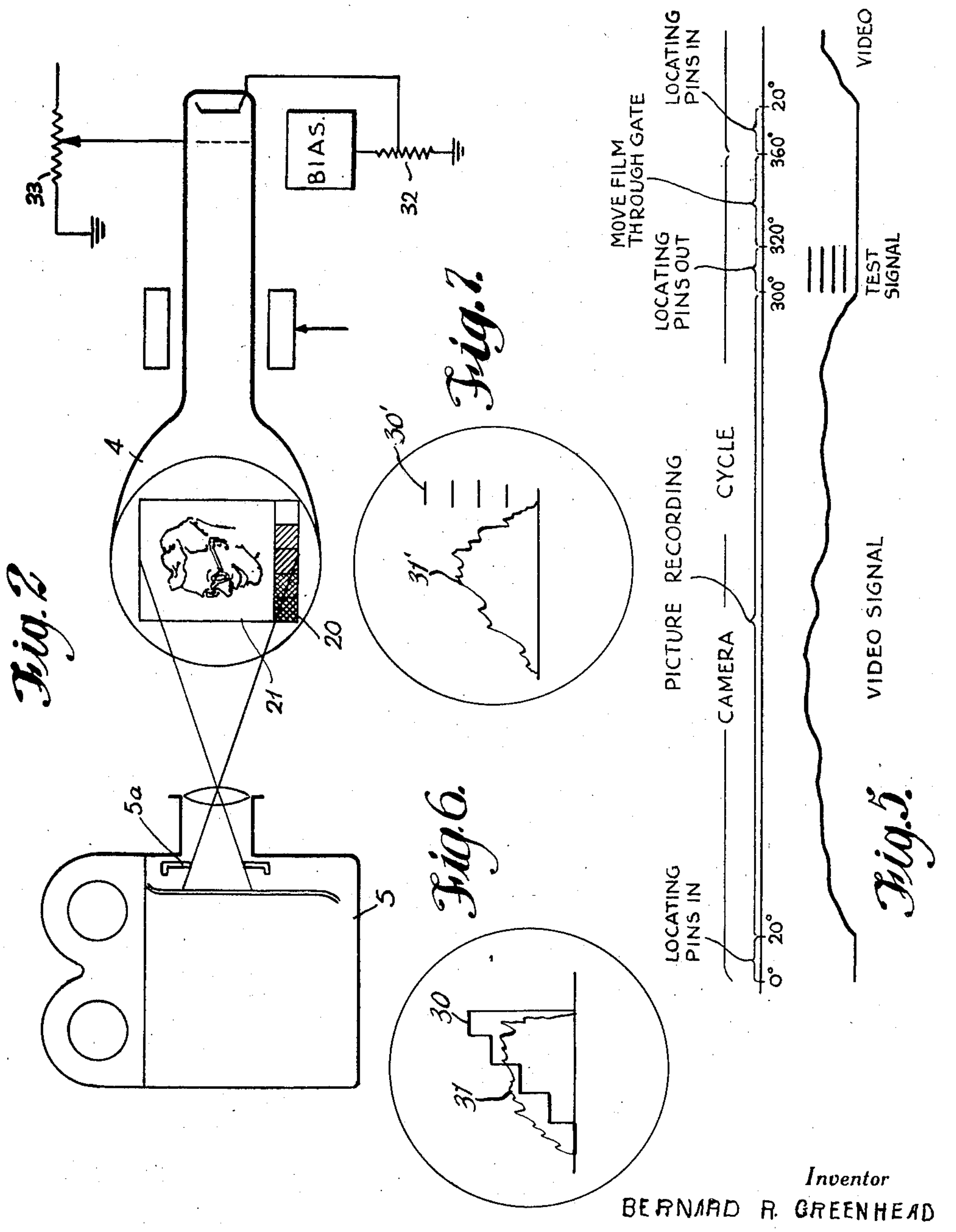
Figure 3:
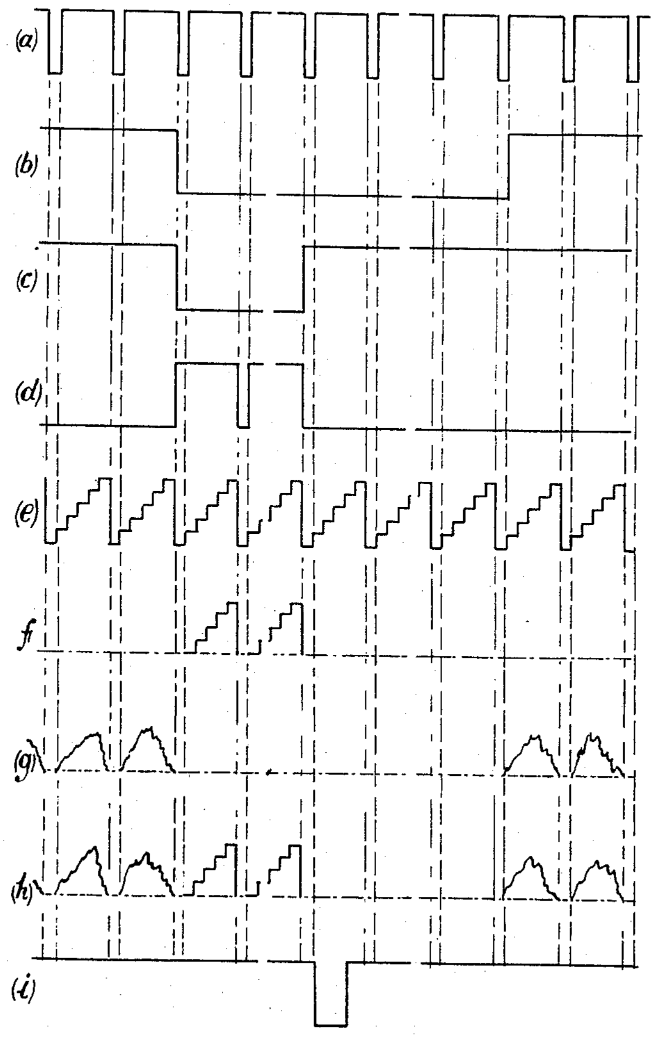
Figure 4:
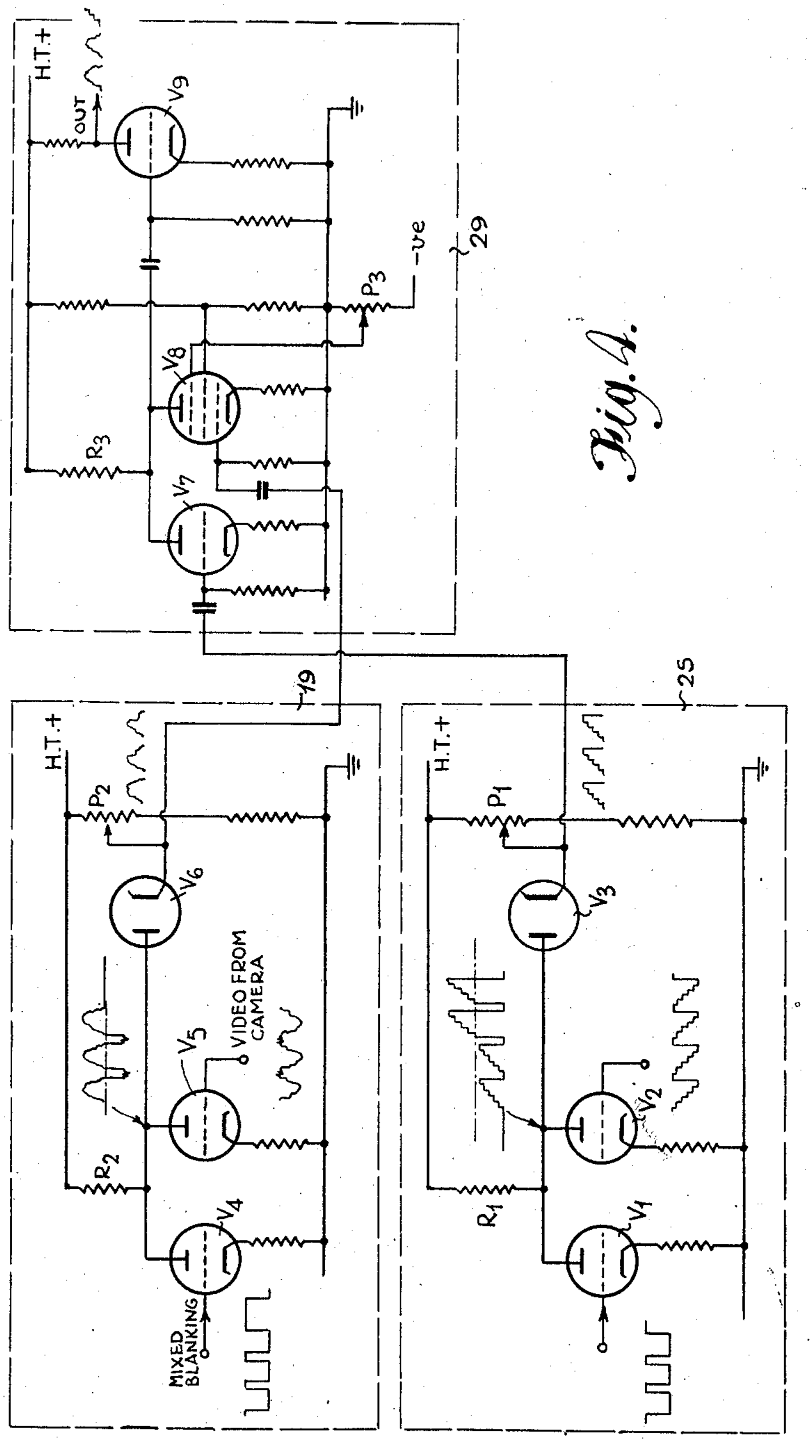
Figure 7:
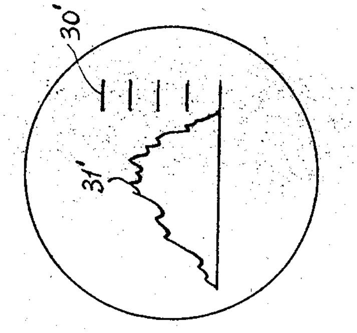
Figure 6:
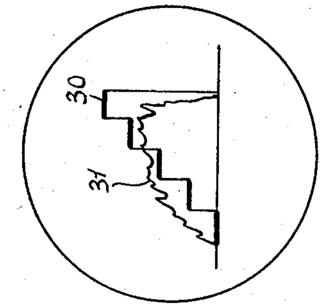

Figure 2 is a diagrammatic view of the picture and control signals reproduced on the cathode ray tube, and also illustrates a modification of Figure 1, Figure 3*a* to 3*i* are waveform diagrams, Figure 4 is a circuit diagram showing the basic circuits for the step gate and a part of a camera control unit, Figure 5 is a diagram illustrating the operating cycle of the apparatus of Figure 1, Figures 6 and 7 are views of the signals appearing on the waveform monitor tube at line and frame frequency respectively.

The apparatus illustrated in Figure 1 of the drawings is for recording motion picture films by the intermediary of television transmission equipment. The apparatus generally comprises a plurality of television cameras, two being indicated in the drawing at 1, 1' respectively, each of which is associated in known manner with a camera control unit represented by the dotted rectangles 2, 2', the outputs from which are fed to the vision signal mixer 3 which may be of known construction and serves for selecting, mixing or fading the video signal outputs from the different camera control units to produce the required video signal in the output of the vision signal mixer for feeding to the recording cathode ray tube 4 in front of which is arranged a motion picture camera 5 for photographically recording the pictures appearing on the screen of the recording cathode ray tube 4. The television apparatus operates at 24 frames per second to correspond with the standard motion picture speed at which the camera 5 also operates.

Each of the camera control units 2 includes a picture monitor tube 6 with magnetic deflection and a waveform monitor tube 7 with electrostatic deflection on which the video signal output from the associated camera control unit may be displayed for viewing by the operator in charge of that camera control unit. The apparatus also comprises a master monitor represented by the dotted rectangle 8 comprising a picture monitor tube 9 and an electrostatic waveform monitor tube 10. This master monitor may be selectively connected by means of the switch 11 (which in practice is located on the master monitor 8) to the output from the vision signal mixer or to the outputs from the two camera control units, so that the master monitor operator can supervise not only the signals fed to the recording cathode ray tube 4 from the vision signal mixer 3 but also the signals fed from the camera control units 2, 2' to the vision signal mixer 3. The apparatus may also comprise a plurality of further picture monitor tubes for use by the director, lighting engineer and other officers of the studio, three such monitors being indicated by the dotted rectangles 12, 12', 12'' and each comprising a picture monitor tube 13 fed from the output from the vision signal mixer 3. The director's monitor tube is located in the vicinity of the vision signal mixer 3, and the director may also be provided, in known manner, with additional monitors showing the pictures which are being fed into the vision signal mixer from the different camera chains, to facilitate his direction of the programme.

The apparatus also includes a pulse generator 14 which may be of conventional construction and generates or produces line synchronising pulses, frame synchronising pulses (Fig. 3*i*), line blanking pulses (Fig. 3*a*), frame blanking pulses (Fig. 3*b*) and mixed blanking pulses. The line and frame synchronising pulses are fed to control the deflecting waveform generator 15 associated with the recording tube 4, the deflecting waveform generators 16, 16' in the camera control units for producing the deflecting waveforms for the associated monitor tubes 6, 7 and for the camera 1, the deflecting waveform generator 17 associated with the master monitor tubes 9 and 10, and the deflecting waveform generators 18, 18', 18'' associated with the picture monitor tubes 13, 13', 13''. For simplicity the diagram shows a single lead for the synchronising pulses from the pulse generator to the various deflecting waveform generators, but in practice, the line synchronising pulses and frame synchronising pulses would be fed to the deflecting waveform generators over separate channels in order to avoid the necessity of incorporating synchronising separators in the various deflecting waveform generators. The mixed blanking pulses generated by the pulse generator 14 are fed to the video mixing and blanking circuits 19, 19' of the camera control units for blanking out the interline and interframe periods from the video waveform in known manner, thus producing the blanked video waveform shown in Fig. 3*g*.

The camera control units 2, 2' also incorporate other components, not specifically indicated in the drawing, but well known in the art, for exercising control of the associated camera chain. For example they may include controls for the power supplies to the cameras, and switching means for enabling the waveform monitor tubes 7, 7' to monitor the video waveform at frame, line or any other desired frequency.

The apparatus so far described is known in the art of recording motion picture films by the intermediary of television transmission equipment.

According to the invention, the apparatus also includes means for generating a control signal in the form of a step waveform and for mixing this control signal in the outputs from the different camera control units in such timed relationship that the control signal will occur during the frame blanking intervals and will be reproduced on the various monitor picture tubes and the recording picture tube on a plurality of lines of the raster which are normally suppressed by the frame blanking pulses. The control signal appears on the screen of the cathode ray tubes as a step wedge strip having areas of different steps of brightness and may occur either along the bottom or top of the area of the screen on which the picture is reproduced depending upon whether the control signal is inserted in the frame blanking intervals either before or after the frame retrace. In the embodiment described the control signals are inserted during the frame blanking intervals before the frame retrace so so that they will appear, as shown in Figure 2, as a step wedge strip 20 at the bottom of the picture area 21. For purposes of clarity in illustration, only five steps are shown in the strip 20, and also only five steps will be described or indicated in the following, although in practice ten steps are preferably used in order to give a finer degree of control.

The step waveform is generated by the step generator 22 comprising a pulse generator 23 which produces a train of square pulses and is synchronised by the trailing edges of the line blanking pulses (Fig. 3*a*) from the pulse generator 14, the output from the pulse generator 23 being fed to a counter 24 which integrates the pulses into a step waveform as shown in Figure 3*e*. The pulse generator 23 produces a predetermined number of square pulses during each line period; in the example illustrated it produces five pulses during the effective line scanning time. Each section of the step waveform will thus have five steps during the effective line scanning period. The amplitude of the steps may increase according to a linear, logarithmic or other desired scale. One form of step waveform generator is described in an article entitled "Linear Staircase Generator for Television Use," by A. M. Spooner and F. W. Nicholls in "Electronic Engineering," December 1951, page 481.

The output from the step generator 22 is fed to the step gate 25 which allows only those sections of the step waveform to pass which occur during those parts of the frame blanking interval when they are to be inserted in the video waveform. The step gate 25 is controlled by the gate pulse generator 26 which may comprise a monostable multi-vibrator 27 synchronised from the leading edges of the frame blanking pulses (Fig. 3*b*) from the pulse generator 14 so as to produce pulses (Fig. 3*c*) the leading edge of each of which coincide with the leading edge of a frame blanking pulse (Fig. 3*b*) and of which the trailing edge occurs after a predetermined number of lines have been scanned but before the occurrence of a frame synchronising pulse (Fig. 3*i*). The output from the multi-vibrator 27 is fed to the mixer 28 where it is mixed with line blanking pulses (Fig. 3*a*)

from the pulse generator 14, the output from the mixer thus comprising the gate pulses (Fig. 3d) which are fed to the step gate 25 so as to allow the output from the step generator 22 to pass only during the gate pulses. The step gate thus gates out the unwanted parts of the step waveform and the gated step waveform output therefrom is indicated in Figure 3f and comprises a series of sections of the step waveform occurring at line frequency but only during the initial part of the frame blanking interval and before the occurrence of the frame synchronising pulse.

The output from the step gate 25 is mixed in the video outputs from the two camera control units 2, 2′ by feeding the outputs from the step gate 25 and from the video and blanking mixers 19, 19′ (Fig. 3g) to the step signal inserters 29, 29′ respectively. The output waveform from a step signal inserter 29 (i.e. the output from a camera control unit) is shown in Figure 3h and comprises the blanked video waveform having the step waveform inserted during the initial part of the frame blanking interval. This waveform will display the picture and the control signal on the screens of the cathode ray tubes in the manner indicated in Figure 2.

Figure 4 shows one form of basic circuit for the step gate 25 and of the step signal inserter 29. For the purpose of fully understanding the invention, it also shows one known form of basic circuit for the video and blanking mixer 19.

The step gate 25 comprises two triode valves V1 and V2 having a common anode load R1. The gate pulse waveform (Fig. 3d) and the step waveform (Fig. 3e) are fed to the grids of the valves V1, V2 respectively with negative polarity so that a mixed waveform is produced across the anode load R1 in which, during the gate pulse periods, sections of the step waveform are superimposed on the gate pulses and raised above the sections of the step waveform occurring at other times, as indicated by the waveform at R1 in Figure 4. The output from the valves V1 and V2 is applied to the anode of a diode V3 whose cathode is biased by means of an adjustable potentiometer P1 so that the diode V3 only conducts during those times when sections of the step waveform are superimposed on the gating pulses, whereby only these sections of the step waveform which occur during the gating pulses appear in the output from the diode V3 (Fig. 3f).

The video and blanking mixer 19 may be constructed similar to the step gate 25 and comprises two triodes V4, V5 having a common anode load R2. To the grids of these valves are respectively fed, with negative polarity, the mixed blanking waveform and the video signal from the camera. In the combined signal developed across R2, the video waveform is raised during the intervals between the blanking pulses and this combined signal is fed to the anode of diode V6, the cathode of which is biased by the adjustable potentiometer P2 so that only those parts of the video waveform which do not occur during the blanking pulses will appear in the output from V6 (Fig. 3g). The point of cut-off can be adjusted by the potentiometer P2 which thus serves as a black level control for the video waveform.

The outputs from the step gate 25 and the video and blanking mixer 19 are mixed in the step signal inserter 29 which comprise a valve V7, which may be a triode or pentode, and a pentode V8 having a common anode load R3. The gated step waveform (Fig. 3f) passed by the step gate 25 is applied to the grid of V7 and the blanked video waveform (Fig. 3g) from the video and blanking mixer 19 is applied to the control grid of pentode V8. Due to the timing of the waveforms, the combined waveform developed across the output resistance R3 will have the step waveform sections inserted in the first part of the frame blanking intervals of the video waveforms, as shown in Figure 3h. This combined signal is fed through triode V9, to invert its polarity, to the monitor tubes 6, 7, and to the vision signal mixer 3. The potentiometer P3 connected across a negative voltage supply feeds the suppressor grid of pentode V8 with an adjustable negative bias whereby the gain of the video signals may be adjusted. Potentiometer P3 thus constitutes the gain control for the video signals and enables the amplitude of the video signals to be adjusted in relation to the step waveform.

The control signal waveform in the output from a camera control unit, apart from being visibly indicated as a step wedge along the bottom of the picture displayed on the associated picture monitor tube 6, is also indicated on the waveform monitor tube 7 on which appear both the steps of the step waveform and the video signal. If the waveform monitor 7 is switched for monitoring at line frequency the waveforms appear on its screen as indicated in Figure 6 with the steps of the step waveform 30 superimposed on the video waveform 31. If the waveform monitor 7 is switched for monitoring at frame frequency, the step waveform 30′ appears on the screen at the end of the video waveform 31′ in the manner shown in Figure 7. The camera control unit operator can thus visually adjust the black level control P2 until the part of the video waveform which is required to be represented as black corresponds with the lowest step of the step waveform, and also the gain control P3 until a selected lighter part of the picture, which can be identified from the waveform monitor, has the required amplitude as indicated by comparison with the steps of the step waveform also appearing on the waveform monitor tube. These adjustments can alternatively be made by comparison of the picture with the step wedge signal on the picture monitor tube 6. Since the same step waveform is fed to all camera control units, the black level and gain controls of the different camera control units can each be easily adjusted, by comparison of the video signals with the step waveforms on the different waveform monitor tubes 7, 7′, and/or by inspection of the picture monitor tubes 6, 6′, so that the video signal outputs from the different camera chains will be correctly matched, and consequently the quality of the pictures reproduced on the recording tube 4, when switching over from one camera chain to another, will remain consistent. The master monitor operator, by actuating his switch 11, can monitor the outputs from the different camera chains and instruct the camera control unit operators to effect any adjustments necessary in their camera control units to achieve and maintain accurate matching throughout the whole recording process.

The bias control 32 to the cathode of the recording tube 4 and the control 33 which controls the amplitude of the signals applied to the recording tube 4, can be adjusted to achieve the requisite brightness and contrast of the picture reproduced on the recording tube 4 for satisfactory filming. The bias control 32 is adjusted so that the darkest area of the step wedge signal will only just produce an image on the negative motion picture film in the camera 5, and the contrast control 33 is adjusted so that the brightness area of the step wedge signal will produce maximum density of the negative film. These values may be initially determined by a test exposure, the intensities of the darkest and lightest steps being measured when the correct values are determined so that the apparatus can easily be set up for subsequent recording on film of that particular grade by the use of a light meter. For this purpose a portable light meter may be used, or alternatively as shown in Figure 1, mirrors 34 may be arranged in front of the darkest and lightest areas of the step wedge signal reproduced on the screen of the tube so that the light from these two areas will be reflected respectively into two photo-cells 35, 36 connected respectively to meters 37, 38 by which the light intensities may be measured and adjusted.

If necessary, the step wedge control signal can be distorted in a part of the circuit where corresponding distortion of the picture signals will be simultaneously produced to compensate for the non-linear response characteristic of the recording cathode ray tube and/or of the recording film.

The insertion of the control signal into the video waveform enables a continuous check to be kept throughout the whole recording process, on any variations which may occur in the entire amplifier and cathode ray tube system or in other factors, thus enabling compensation to be made for any change which may occur in any part of the recording or ancillary apparatus, for example for variations in gain of the video amplifier channels or for changes in studio lighting.

By reason of the step wedge signal appearing on the screen of all picture monitor tubes, the brightness and contrast controls 39 and 40 of the master monitor and 41, 42 of the other monitors 12 may be adjusted so that the pictures reproduced on all these monitor tubes will be of identical brightness and contrast and correspond exactly with the pictures as they will appear on the processed film print.

The motion picture camera 5 may be of any appropriate design and in the embodiment shown in Figure 1, since the mirrors 34 are arranged in front of the step wedge signals, the film gate *5a* in the camera is made of such a size that only the picture area 21 (Fig. 2) will be recorded on the film. If desired the step wedge signal may also be recorded on the film. This may be effected by removing the mirrors 34 and enlarging the film gate *5a* (Fig. 2) so that the whole of the illuminated area on the cathode ray tube, namely the picture area 21 and the step wedge area 20 will be recorded on the film. By recording the control signal on the film, the control signals can be used to keep a check on the processing of the film.

Figure 5 is a diagram showing the video and control signal waveform in relation to the time sequence through one cycle, indicated as 360°, of the film camera. As shown in Figure 5, the first 20° of the cycle is employed for moving into position the locating pins which hold the film positioned in the gate, and the frame blanking pulse extends up to the end of this period. During the next 280° of the cycle that is up to the 300° position, the video signal is recorded on the film. At the end of this period the frame blanking pulse commences. From 300° to 320° the locating pins are withdrawn and the claw mechanism moves forward to engage the film, the film being moved down during the period from 320° to 360°. During the period 300° to 320°, that is the initial period of the frame blanking pulse which extends from 300° in one cycle to 20° in the next cycle, the step wedge control signal is inserted in the video waveform and reproduced on the cathode ray tubes. Due to the restricted size of the gate *5a*, however, this signal will not be recorded on the film. No shutter is required in the camera.

If the control signal is to be recorded on the film, then the area of the gate *5a* must be increased so that recording will continue until the 320° position in the camera cycle.

If the control signal is alternatively, superimposed on the video waveform before the commencement of picture scanning, then it may be inserted in the waveform during the period of the cycle of the camera from 0° to 20°.

The arrangements described are intended for use where sequential scanning is employed. If, for example, there are 900 lines per frame, then the period from 20° to 300° will correspond to seven-ninths of the frame time, or 700 lines; that means that 700 lines of video signals will be reproduced on the cathode ray tube and recorded on the film. In the example quoted, the frame blanking pulse extends for a period of 200 lines of which the first 50 lines are used for displaying the control signal.

Whilst a particular embodiment has been described, it will be understood that various modifications may be made without departing from the scope of the invention. For example, if interlaced scanning is employed it is preferable to insert the control signal in the line blanking intervals so as to occur either at the beginning or end of each line. The control signal will then appear as a vertical bar along either the left-hand or right-hand side of the picture instead of along the top or bottom of the picture as is the case when the control signal is inserted during the frame blanking period. With interlaced scanning the scanning beam of the cathode ray tube has to scan two rasters during each whole frame period, which means that the long frame blanking period between successive rasters which is necessary to incorporate the control signal, cannot be tolerated. This difficulty is overcome by inserting the control signals in the line blanking periods as above described. If necessary, the duration of the line blanking periods may be increased to allow more space for the insertion of the control signal.

The control signal need not actually be mixed with the video waveform. It can, for example, be applied directly to a control electrode of the recording cathode ray tube or the monitor tubes, which control electrode may be the same as or different from that to which the video signals are applied. In a modification, a double-beam tube may be used as a waveform monitor, the video signal modulating one beam and the step waveform modulating the other beam so that both waveforms will appear simultaneously on the same screen.

The television equipment and the camera can, if desired, be run at speeds other than 24 frames per second.

Although the invention has been particularly described in connection with the recording of motion picture films, the method of and apparatus for the control of picture signals according to this invention can be applied to television transmission equipment in general. For example, it can be used for controlling the picture signals transmitted by wire or radio from a television station in which case the output from the vision signal mixer 3 of Figure 1 would, instead of or in addition to being fed to the recording tube 4, be fed to a transmitter indicated at 43. Alternatively or additionally, the video signals may be recorded on a magnetic recording medium in the magnetic recorder 44.

I claim:

1. Apparatus comprising a television camera producing a video signal output, a picture reproducing cathode ray tube, means for scanning said television camera and said cathode ray tube at the same line and frame frequencies, means for blanking out portions of the video signal output from said camera between successive lines and between successive frames to produce a blanked video waveform including series of line and frame blanking intervals, an amplifier for amplifying said blanked video waveform, means for adjusting the black level of said blanked video waveform, means for adjusting the gain of said amplifier, means for producing a control signal independently of said video signals and recurring at a repetition frequency synchronised with one of said series of blanking intervals, means for inserting said control signal into the amplified and black level-adjusted blanked video waveform during said one series of blanking intervals to produce a composite waveform comprising video and control signals, means for modulating said picture reproducing cathode ray tube, means for feeding said composite waveform to said modulating means to reproduce said video signals and said control signal simultaneously on said picture reproducing tube, but the black level and gain of said video signals reproduced on said picture reproducing tube being adjustable independently of said control signal means for adjusting the brightness of the images of the composite waveform reproduced on said picture reproducing tube, means for adjusting the contrast of the images of the composite waveform reproduced on said picture reproducing tube.

2. Apparatus comprising a television camera producing a video signal output, a picture reproducing cathode ray tube, means for scanning said television camera and said cathode ray tube at the same line and frame frequencies, means for blanking out portions of the video signal output from said camera between successive lines and between successive frames to produce a blanked video waveform including series of line and frame blanking intervals, an amplifier for amplifying said blanked video waveform, means for adjusting the black level of said blanked video waveform, means for adjusting the gain of said amplifier, means for producing a control signal independently of said video signals and recurring at a repetition frequency synchronised with one of said series of blanking intervals, means for inserting said control signal into the amplified and black level-adjusted blanked video waveform during said one series of blanking intervals to produce a composite waveform comprising video and control signals, a waveform monitor cathode ray tube, means for deflecting the cathode ray of said waveform monitor tube in one direction in timed relation with said line and frame frequencies, means for deflecting the cathode ray of said waveform monitor tube in a direction at right angles to said one direction by the composite waveform, means for modulating said picture reproducing cathode ray tube, means for feeding said composite waveform to said modulating means to reproduce said video signals and said control signal simultaneously on said picture reproducing tube, but the black level and gain of said video signals reproduced on said picture reproducing tube being adjustable independently of said control signal means for adjusting the brightness of the images of the composite waveform reproduced on said picture reproducing tube, means for adjusting the contrast of the images of the composite waveform reproduced on said picture reproducing tube.

3. Apparatus comprising a television camera producing a video signal output, a picture reproducing cathode ray tube, means for scanning said television camera and said cathode ray tube at the same line and frame frequencies, means for blanking out portions of the video signal output from said camera between successive lines and between successive frames to produce a blanked video waveform including series of line and frame blanking intervals, an amplifier for amplifying said blanked video waveform, means for adjusting the black level of said blanked video waveform, means for adjusting the gain of said amplifier, means for continuously producing a control signal in the form of a repeating step waveform, each section of said step waveform having a plurality of steps of different amplitude and recurring at the line frequency, means for selecting from said repeating step waveform a plurality of sections which occur during the frame blanking intervals, means for blanking out these parts of the selected sections which occur during the line blanking intervals, means for inserting said selected blanked sections of the step waveform into the amplified and black level-adjusted blanked video waveform during the frame blanking intervals to produce a composite waveform comprising video signals with a plurality of sections of the step waveform occurring only during at least part of the frame blanking intervals, means for modulating said picture reproducing cathode ray tube, means for feeding said composite waveform to said modulating means to reproduce said video signals and said step waveform simultaneously on said picture reproducing tube, but the black level and gain of said video signals reproduced on said picture reproducing tube being adjustable independently of said step waveform means for adjusting the brightness of the images of the composite waveform reproduced on said picture reproducing tube, and means for adjusting the contrast of the images of the composite waveform reproduced on said picture reproducing tube.

4. Apparatus comprising television means producing a video signal output, means for scanning said television means at line and frame frequencies, means for blanking out portions of the video signal output from said television means between successive lines and between successive frames to produce a blanked video waveform including series of line and frame blanking intervals, an amplifier for amplifying said blanked video waveform, means for adjusting the black level of said blanked video waveform, means for adjusting the gain of said amplifier, means for producing a control signal in the form of a repeating step waveform, each section of said step waveform having a plurality of steps of different amplitude and recurring at the line frequency, means for selecting from said repeating step waveform a plurality of sections which occur during the frame blanking intervals, means for inserting said selected sections of the step waveform into the amplified and black level-adjusted blanked video waveform during the frame blanking intervals to produce a composite waveform comprising video signals with a plurality of sections of the step waveform occurring only during at least part of the frame blanking intervals, a picture monitor cathode ray tube, means for scanning said picture monitor tube in synchronism with said television means at said line and frame frequencies, and means for modulating said picture monitor tube with the composite waveform to reproduce said video signals and step waveform simultaneously thereon, but with the black level and gain of said video signals adjustable independently of said step waveform.

5. Apparatus comprising television means producing a video signal output, means for scanning said television means at line and frame frequencies, means for blanking out portions of the video signal output from said television means between successive lines and between successive frames to produce a blanked video waveform including series of line and frame blanking intervals, an amplifier for amplifying said blanked video waveform, means for adjusting the black level of said blanked video waveform, means for adjusting the gain of said amplifier, means for producing a control signal in the form of a repeating step waveform, each section of said step waveform having a plurality of steps of different amplitude and recurring at the line frequency, means for selecting from said repeating step waveform a plurality of sections which occur during the frame blanking intervals, means for inserting said selected sections of the step waveform into the amplified and black level-adjusted blanked video waveform during the frame blanking intervals to produce a composite waveform comprising video signals with a plurality of sections of the step waveform occuring only during at least part of the frame blanking intervals, a waveform monitor cathode ray tube, means for deflecting the cathode ray of said waveform monitor tube in one direction in timed relation with said line and frame frequencies, and means for deflecting the cathode ray of said waveform monitor tube in a direction at right angles to said one direction by the composite waveform to reproduce said video waveform and step waveform simultaneously thereon, but with the black level and gain of said video waveform adjustable independently of said step waveform.

6. Apparatus comprising a plurality of television cameras each producing a video signal output, a picture reproducing cathode ray tube, means for synchronously scanning said television cameras and said cathode ray tube at the same line and frame frequencies, a plurality of camera control channels to which said output video signals are respectively fed, means for blanking out portions from each of the video signal outputs from said cameras between successive lines and successive frames to produce in each of said channels a plurality of blanked video waveforms each including series of line and frame blanking intervals, a plurality of amplifiers, one in each of said channels, for amplifying the blanked video waveforms in said channels respectively, means for independently adjusting the gain of each of said amplifiers, means for independently adjusting the black level of the blanked video waveforms in each of said channels, means for producing a control signal independently of said video signals and recurring at a repetition frequency synchronised with one of said series of blanking intervals, means in each of said channels for inserting said control signal into the respective amplified and black level-adjusted blanked video waveforms in said channels during said one series of blanking intervals to produce in each channel a composite waveform comprising video and control signals, a plurality of picture monitor cathode ray tubes each respectively associated with one of said channels, means for scanning said picture monitor tubes in synchronism with said camera at said line and frame frequencies, means for modulating each of said picture monitor tubes with the composite waveform of its associated channel to reproduce the video signals and control signal simultaneously thereon, but with the black level and gain of a said video signals adjustable independently of said control signal, a plurality of waveform monitor cathode ray tubes each respectively associated with one of said channels, means for deflecting the cathode ray of each of said waveform monitor tubes in one direction in timed relation with said line and frame frequencies, means for deflecting the cathode ray of each of said waveform monitor tubes in a direction at right angles to said one direction by the composite waveform of its associated channel to reproduce the video waveform and control signal waveform simultaneously thereon, but with the black level and gain of said video waveform adjustable independently of said control signal waveform, a vision mixer, means for feeding the composite waveforms from each of said channels to said vision mixer, means for modulating said picture reproducing cathode ray tube, means for feeding the output from said vision mixer to said modulating means, means for adjusting the brightness of the images reproduced on said picture reproducing cathode ray tube and means for adjusting the contrast of the images reproduced on said picture reproducing cathode ray tube.

References Cited in the file of this patent

UNITED STATES PATENTS

| | | |
|---|---|---|
| 2,164,297 | Bedford | June 27, 1939 |
| 2,240,420 | Schitzer | Apr. 29, 1941 |
| 2,668,188 | Naslund | Feb. 2, 1954 |
| 2,683,187 | Rynn | July 6, 1954 |
| 2,686,220 | Sziklai | Aug. 10, 1954 |
| 2,763,833 | Brumbaugh | Sept. 18, 1956 |

OTHER REFERENCES

"Television broadcasting," Chinn; published 1953, pages 628 and 635.